(12) United States Patent
Shim et al.

(10) Patent No.: US 10,303,281 B2
(45) Date of Patent: May 28, 2019

(54) CONTACT SENSITIVE DEVICE

(71) Applicants: LG Display Co., Ltd., Seoul (KR); Industry-Academic Cooperation Foundation, Yonsei University, Seoul (KR)

(72) Inventors: WooYoung Shim, Seoul (KR); HanSaem Kang, Paju-si (KR); KiSeok Chang, Paju-si (KR); WookSung Kim, Goyang-si (KR); SungPil Ryu, Paju-si (KR); GwangMook Kim, Seoul (KR); SungJun Cho, Goyang-si (KR); JaeMin Myoung, Goyang-si (KR)

(73) Assignees: LG Display Co., Ltd., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 15/872,726

(22) Filed: Jan. 16, 2018

(65) Prior Publication Data

US 2018/0203558 A1 Jul. 19, 2018

(30) Foreign Application Priority Data

Jan. 16, 2017 (KR) .................. 10-2017-0007292

(51) Int. Cl.
*G06F 3/041* (2006.01)
*G06F 3/039* (2013.01)

(52) U.S. Cl.
CPC ............ *G06F 3/0414* (2013.01); *G06F 3/039* (2013.01); *G06F 2203/04112* (2013.01)

(58) Field of Classification Search
CPC .............................................. G06F 3/041–047
USPC .................... 178/18.07–19.01; 345/173–178
See application file for complete search history.

(56) References Cited

U.S. PATENT DOCUMENTS

| | | |
|---|---|---|
| 5,394,824 A | 3/1995 | Johnson |
| 7,933,058 B2 | 4/2011 | Liu et al. |

*Primary Examiner* — Michael Pervan
(74) *Attorney, Agent, or Firm* — Fenwick & West LLP (57) ABSTRACT

The present disclosure relates to a contact sensitive device and a contact sensitive device according to an exemplary embodiment of the present disclosure includes a base film, a first electrode, a second electrode, a third electrode, and a thermochromic layer. A protruding pattern is disposed on the base film. The first electrode and the second electrode are disposed on the base film and are spaced apart from each other with the protruding pattern therebetween. The third electrode is in contact with the protruding pattern. The thermochromic layer is disposed on the third electrode.

17 Claims, 7 Drawing Sheets

CONTACT SENSITIVE DEVICE

CROSS-REFERENCE TO RELATED APPLICATIONS

This application claims the priority of Republic of Korea Patent Application No. 10-2017-0007292 filed on Jan. 16, 2017, in the Korean Intellectual Property Office, the disclosure of which is incorporated herein by reference in its entirety.

BACKGROUND

Field of Technology

The present disclosure relates to a contact sensitive device and more particularly, to a contact sensitive device which provides a visual feedback in response to a touch input.

Description of the Related Art

A touch panel is a device which senses a user's touch input such as screen touch to a display device or a gesture and is widely utilized for display devices of public facilities and a large size display device such as a smart TV, in addition to a portable display device such as a smart phone or a tablet PC. The touch panel may be classified into a resistive type, a capacitive type, an optical type, and an electromagnetic (EM) type depending on an operating type.

However, in recent years, research has been conducted on contact sensitive devices which not only sense a touch input by the user, but also transmit various sensory feedbacks such as a tactile sense, a visual sense, or an auditory sense as feedbacks with respect to a touch input of a user.

Generally, the visual feedback is implemented through a display panel disposed below a touch panel. That is, the visual feedback may be provided such that a coordinate of a point where the touch input is applied is detected by sensing the touch input of the user using the touch panel and visual change is generated in a display panel corresponding to a point where the touch input is applied based on the detected position information.

However, the visual feedback through the touch panel and the display panel has a disadvantage in that since various operations need to be performed to provide visual feedback, a response speed is slow. Further, there is another disadvantage in that the touch panel and the display panel need to be simultaneously driven, so that power consumption is increased. There is another disadvantage in that the display panel includes pixels for implementing an image so that a thickness thereof is large and a manufacturing cost is high.

Therefore, it is requested to develop a contact sensitive device which is capable of instantly providing visual feedback in response to a touch input of a user and being implemented to be a thin film with low power consumption.

SUMMARY

An object to be achieved by the present disclosure is to provide a contact sensitive device which is capable of providing an instant visual feedback in response to a touch input of a user without providing a separate display panel.

Another object to be achieved by the present disclosure is to provide a contact sensitive device which is capable of being implemented as a thin film and providing various visual feedbacks in response to a strength of the touch input as well as a coordinate of a touch input.

Objects of the present disclosure are not limited to the above-mentioned objects, and other objects, which are not mentioned above, can be clearly understood by those skilled in the art from the following descriptions.

In order to solve the above-described problems, a contact sensitive device according to an aspect of the present disclosure includes a base film, a first electrode, a second electrode, a third electrode, and a thermochromic layer. A protruding pattern is disposed on the base film. The first electrode and the second electrode are disposed on the base film and are spaced apart from each other with the protruding pattern therebetween. The third electrode is in contact with the protruding pattern. The thermochromic layer is disposed on the third electrode. The contact sensitive device according to the exemplary embodiment of the present disclosure includes the third electrode which is in contact with the first electrode and the second electrode to generate Joule heat when a touch input is applied and the thermochromic layer which changes the color based on the Joule heat of the third electrode so that it is possible to simultaneously sense the touch input and provide a visual feedback corresponding to the touch input. Further, it is possible to sense the touch input and provide the visual feedback corresponding to the touch input without using a separate display panel so that a contact sensitive device which has a small thickness, low power consumption, and a low manufacturing cost may be provided.

In order to solve the problem as described above, a contact sensitive device according to another aspect of the present disclosure includes a base film, a plurality of electrodes, a heat generating layer, a heat transfer layer, a thermochromic layer, and a protective substrate. The base film includes a base part and a protrusion protruding from the base. The plurality of electrodes is disposed on the base film to cover at least a part of the side of the protrusion and the base. The heat generating layer is in contact with the protrusion on the plurality of electrodes. The heat transfer layer is disposed on the heat generating layer. The thermochromic layer is disposed on the heat transfer layer. The protective substrate is disposed on the thermochromic layer.

Other detailed matters of the exemplary embodiments are included in the detailed description and the drawings.

According to the present disclosure, it is possible to simultaneously sense a touch input and provide a visual feedback, only using one contact sensitive device, without using a separate display panel.

According to the present disclosure, it is possible to instantly provide a visual feedback in response to a touch input of a user.

According to the present disclosure, it is possible to provide a contact sensitive device which provides a visual feedback in response to a touch input of a user with a thin thickness without using a separate display panel.

According to the present disclosure, it is possible to provide various visual feedbacks in response to a strength of the touch input as well as a coordinate of a touch input of a user.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Further, in the following description of the present disclosure, a detailed explanation of known related technologies may be omitted to avoid unnecessarily obscuring the subject matter of the present disclosure. The terms such as "including," "having," and "comprise of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is disposed on other element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways as understood by those skilled in the art, and the embodiments can be carried out independently of or in association with each other.

Hereinafter, various exemplary embodiments of the present disclosure will be described in detail with reference to accompanying drawings.

Figure 1:
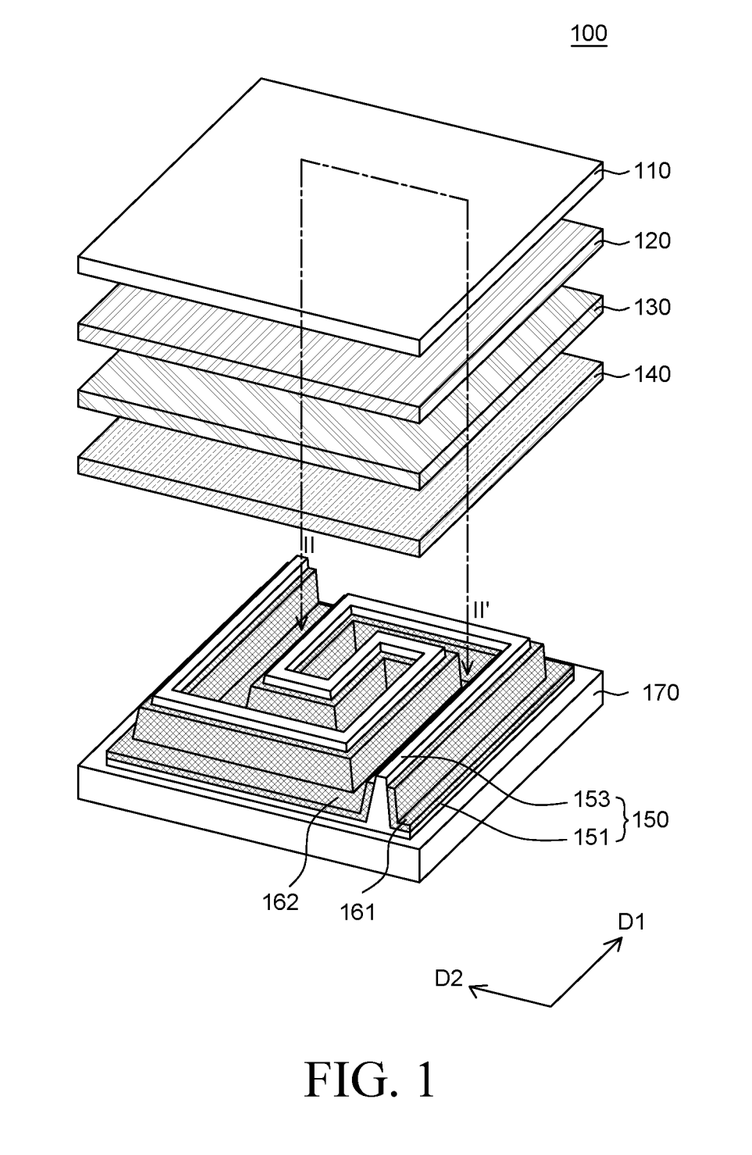
FIG. 1 is a schematic exploded perspective view of a contact sensitive device according to an exemplary embodiment of the present disclosure.
Figure 2A:
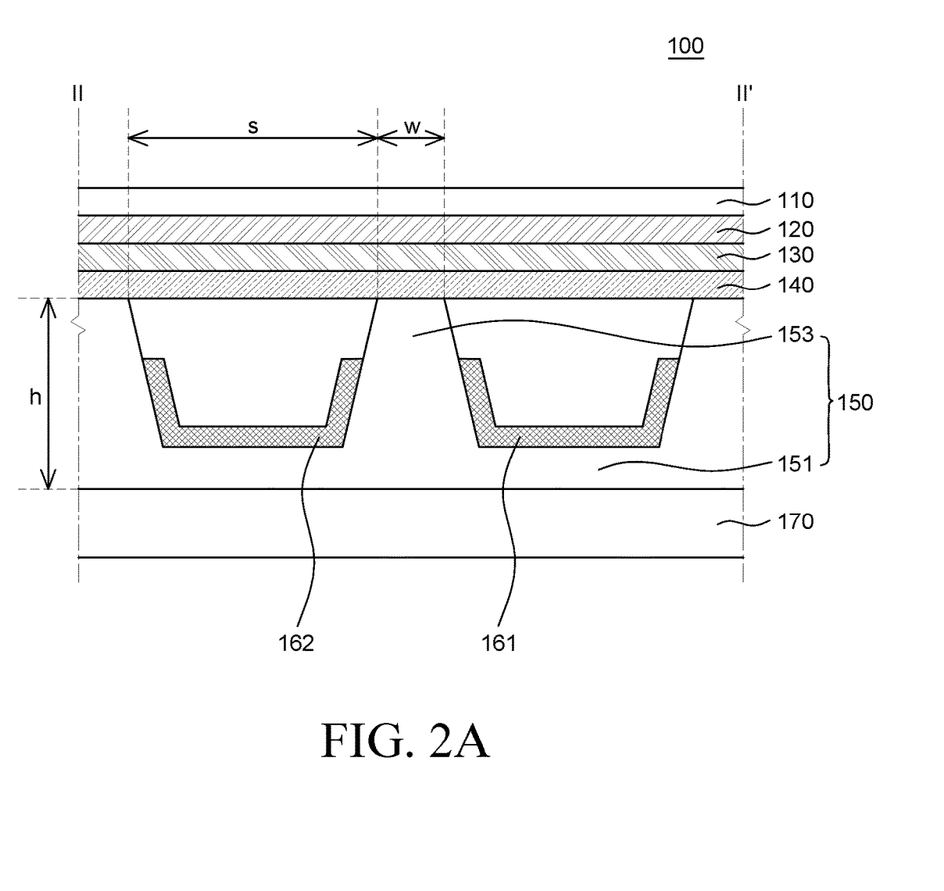
FIGS. 2A and 2B are cross-sectional views taken along the line II-II' of FIG. 1 for explaining a driving method of a contact sensitive device according to an exemplary embodiment of the present disclosure.
Figure 2B:
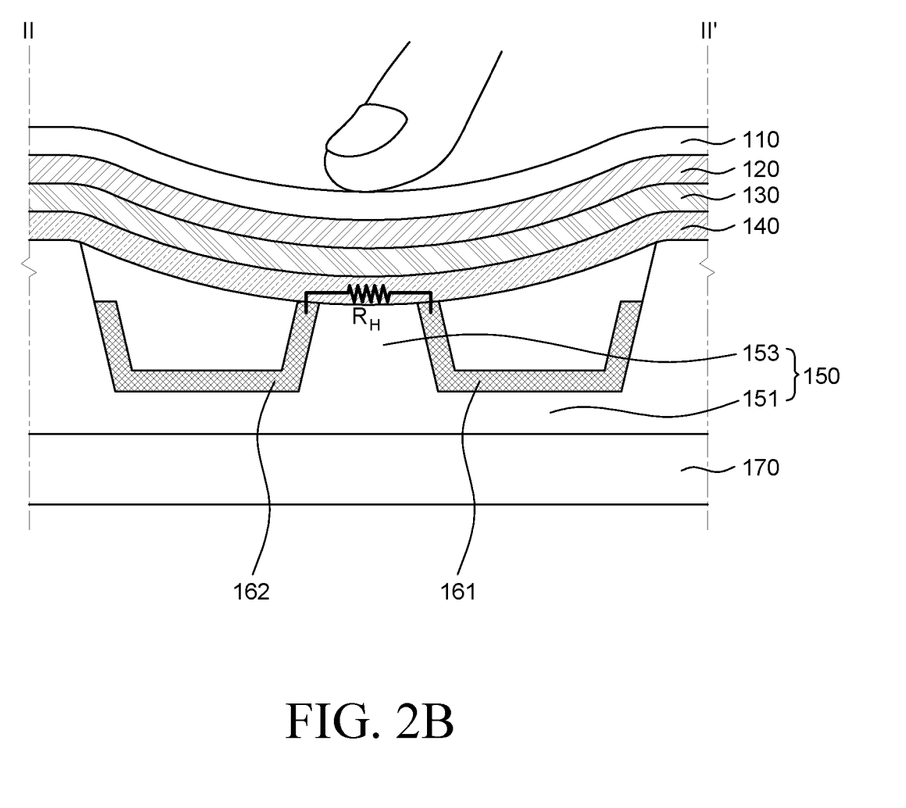

FIG. 1 is a schematic exploded perspective view of a contact sensitive device according to an exemplary embodiment of the present disclosure and FIGS. 2A and 2B are cross-sectional views taken along the line II-II' of FIG. 1 for explaining a driving method of a contact sensitive device according to an exemplary embodiment of the present disclosure. In FIGS. 1 to 2B, a power supply unit which provides a driving voltage to a first electrode 161 and a second electrode 162 is omitted.

Referring to FIG. 1, a contact sensitive device 100 includes a supporting substrate 170, a base film 150, a first electrode 161, a second electrode 162, a third electrode 140, a heat transfer layer 130, a thermochromic layer 120, and a protective substrate 110.

The contact sensitive device 100 provides a visual feedback in response to a touch input and changes a color of a point where the touch input is input. Specifically, when a touch input is applied, Joule heat is generated to the third electrode 140 at a point where the touch input is applied and the Joule heat is transferred to the thermochromic layer 120 through the heat transfer layer 130. The color of the thermochromic layer 120 may be changed due to the Joule heat.

Specifically, the thermochromic layer 120 includes thermochromic particles whose color is changed by heat and reflects light of a specific wavelength at a room temperature (20° C.). Therefore, the thermochromic layer 120 has a specific color at a room temperature. However, when heat energy is applied to the thermochromic layer 120, optical properties of the thermochromic particles of the thermochromic layer 120 may be changed and a color of the thermochromic layer 120 may be changed.

That is, the thermochromic particles of the thermochromic layer 120 include a thermochromic dye formed of an electron donor and an electron acceptor. When heat energy is applied, the electron donor and the electron acceptor are coupled to each other or separated from each other and the optical properties of the thermochromic particles are changed so that the thermochromic particles may transmit light of a visible light wavelength. Therefore, the thermochromic layer 120 has translucency and may be transparent at a point where the touch input is applied.

Prior to describing components of the contact sensitive device 100 according to an exemplary embodiment of the present disclosure in detail, a driving principle of the contact sensitive device 100 according to an exemplary embodiment of the present disclosure will be briefly described with reference to FIGS. 2A and 2B.

Referring to FIG. 2A, when a touch input is not applied, the third electrode 140 is separated from the first electrode 161 and the second electrode 162. The third electrode 140 is in contact with a protruding pattern 153 of the base film 150 and is electrically separated from the first electrode 161 and the second electrode 162 through the protruding pattern 153.

Referring to FIG. 2B, when the touch input is applied, a pressure is transmitted to the protruding pattern 153 of the base film 150 through the protective substrate 110, the thermochromic layer 120, the heat transfer layer 130, and the third electrode 140. In this case, the protruding pattern 153 is compressed by the pressure due to the touch input. As the protruding pattern 153 is compressed, the third electrode 140 is in contact with the first electrode 161 and the second electrode 162. In this case, current flows in the third electrode 140 based on a potential difference between the first electrode 161 and the second electrode 162 and Joule heat is locally generated in the third electrode 140 due to a resistance $R_H$ of the third electrode 140. The Joule heat of the third electrode 140 is transferred to the thermochromic layer 120 through the heat transfer layer 130.

The Joule heat which is generated through the third electrode 140 at the point where the touch input is applied is transferred to the thermochromic layer 120 through the heat transfer layer 130 and the optical properties of the thermochromic particles of the thermochromic layer 120 are changed. Therefore, the color of the thermochromic layer 120 may be transparent at the point where the touch input is applied and the color of the heat transfer layer 130 which is disposed below the thermochromic layer 120 may be visible through the thermochromic layer 120 at the point where the touch input is applied.

When the touch input is released, the compressed protruding pattern 153 may be restored to its original state. Therefore, the third electrode 140 is separated from the first electrode 161 and the second electrode 162 and the joule heat of the third electrode 140 is reduced. Therefore, the temperature of the thermochromic layer 120 is restored to the room temperature and a portion of the thermochromic layer 120 which is transparent may become opaque again. Therefore, the color of the point where the touch input is applied may be restored to the color of the thermochromic layer 120. Consequently, the contact sensitive device according to the exemplary embodiment of the present disclosure changes the color of the point where the touch input is applied to provide a visual feedback for the touch input. Hereinafter, components of the contact sensitive device 100 will be described in detail.

Referring to FIGS. 1 and 2A, the supporting substrate 170 is a substrate which supports and protects components of the contact sensitive device 100 and may be formed of an insulating material. For example, the supporting substrate 170 may be configured by a glass substrate or a plastic substrate. When the supporting substrate 170 is configured by a plastic substrate, the supporting substrate 170 may be implemented by a thin plastic film having flexibility formed of a polymer such as polyimide, polyethylene naphthalate (PEN), or polyethylene terephthalate (PET). However, the supporting substrate 170 is not an essential component and may be omitted in some exemplary embodiments.

The base film 150 includes a base part 151 and a protruding pattern (or a protrusion part) 153. The base part 151 of the base film 150 provides a space to dispose the first electrode 161 and the second electrode 162. The protruding pattern 153 of the base film 150 protrudes from the base part 151 and is in contact with the third electrode 140 as illustrated in FIG. 2A. In a state when the touch input is not applied, the protruding pattern 153 separates the third electrode 140 and the first electrode 161 from each other and separates the third electrode 140 and the second electrode 162 from each other. Further, the protruding pattern 153 separates the first electrode 161 and the second electrode 162 from each other.

As illustrated in FIG. 1, the protruding pattern 153 forms a spiral structure. For example, the protruding pattern 153 extends to a first direction D1 which is parallel to one outline of the supporting substrate 170 from one point at a corner of the supporting substrate 170. The protruding pattern 163 which extends to the first direction D1 is bent to extend to a second direction D2 which is perpendicular to the first direction D1. The protruding pattern 153 which extends to the second direction D2 is bent to extend to an opposite direction of the first direction D1 and then bent to extend to an opposite direction of the second direction D2. Therefore, the protruding pattern 153 is bent in a "C" shape and extends to be converged from the edge of the supporting substrate 170 to the center of the supporting substrate 170. Further, the protruding pattern 153 which reaches the center of the supporting substrate 170 is bent in the first direction D1, the opposite direction of the second direction D2, the opposite direction of the first direction D1, the second direction D2, and the first direction D1, in this order. Therefore, the protruding pattern 150 extends to be converged from the center of the supporting substrate 170 to the edge of the supporting substrate 170. That is, the protruding pattern 153 is spirally bent from the point at one corner of the supporting substrate 170 to be converged to the center of the supporting substrate 170 and then spirally bent from the center of the supporting substrate 170 to be converged to a point at another corner in a diagonal direction of the point at one corner of the supporting substrate 170 at which the extension of the protruding pattern 153 starts.

In this case, a height h of the protruding pattern 153 defined as a distance from a lower surface of the base film 150 to an upper surface of the protruding pattern 153 may be at least 46 μm. Further, a width w of the protruding pattern 153 defined as a distance from one outline of the upper surface of the protruding pattern 153 to other outline facing the one outline may be at least 35 μm. Further, a spaced distance s of the protruding pattern 153 defined as a distance from an outline of one portion of the protruding pattern 153 extending to the first direction D1 to an outline of the other portion of the protruding pattern 153 extending to the first direction D1 which is adjacent to the one portion may be at least 100 μm. However, the height h, the width w, and the spacing distance s of the protruding pattern 153 are not limited thereto and various shapes may be selected according to a range of the pressure which is applied to the contact sensitive device 100 as a shape of the protruding pattern 153. For example, when the contact sensitive device 100 is applied to an electronic note, a strength of a handwriting input of the user may be 100 kPa or lower. In this case, a compressible range of the protruding pattern 153 may be sufficiently narrow. In this case, the height h of the protruding pattern 153 may be designed in the range of several hundreds of μm in consideration of the compressible range of the protruding pattern 153. As the height h of the protruding pattern 153 is designed in the range of several hundreds of μm, the width w of the protruding pattern 153 and a spacing distance s between protruding patterns 153 may be adjusted.

The base part 151 and the protruding pattern 153 of the base film 150 are configured by one connected insulator. That is, the base film 150 is configured by one film on which a protruding pattern 153 is formed. In this case, the base film 150 may be manufactured using a silicon mold including a concave portion corresponding to the protruding pattern 153. Specifically, the base film 150 may be manufactured by injecting a constituent material of the base material 150 into the silicon mold including a concave portion corresponding to the protruding pattern 153, hardening the constituent material, and then removing the silicon mold. In this case, a material injected into the concave portion of the silicon mold forms the protruding pattern 153 of the base film 150 and a material injected into a convex portion of the silicon mold forms the base part 151 of the base film 150.

In this case, the material which forms the base film 150 may be an insulating material having flexibility and has an elastic force. For example, the base film 150 may be formed of an insulating material having a Young's modulus of 1.5 MPa or higher. When the Young's modulus of the base film 150 is lower than 1.5 MPa, the protruding pattern 153 may not have sufficient elasticity. In this case, the protruding pattern 153 which is compressed due to the touch input is not quickly restored to the original state and the contact sensitive device 100 may not sense the continuous touch inputs.

The base film 150 may be formed of polydimethylsiloxane (PDMS) as a material having excellent insulating property and having Young's modulus of 1.5 MPa or higher, but is not limited thereto.

In some exemplary embodiments, the protruding pattern 153 of the base film 150 may be formed by a patterning process. For example, the protruding pattern 153 may be formed by forming an insulating layer on the base film 150 and then exposing and developing the insulating layer. In this case, the protruding pattern 153 may be formed of a different material from the base part 151 and may be formed of an insulating material having a Young's modulus of 1.5 MPa or higher.

The first electrode 161 and the second electrode 162 are disposed on the base film 150 and spaced apart from each other with the protruding pattern 153 therebetween. That is, the first electrode 161 and the second electrode 162 cover an upper surface of the base part 151 of the base film 150 and cover at least a part of a side of the protruding pattern 153. In this case, the protruding pattern 153 serves as a partition which suppress electrical contact of the first electrode 161 and the second electrode 162.

The first electrode 161 and the second electrode 162 may be formed of the same conductive material. For example, the first electrode 161 and the second electrode 162 may be formed of a gold (Au) thin film, but is not limited thereto. The first electrode 161 and the second electrode 162 may be formed of copper (Cu), aluminum (Al), molybdenum (Mo), titanium (Ti), silver (Au), chrome (Cr), or an alloy thereof. Further, the first electrode 161 and the second electrode 162 may be formed of a transparent conductive material such as indium tin oxide (ITO) or indium zinc oxide (IZO).

The first electrode 161 and the second electrode 162 may be formed by being coated with the conductive material so as to cover the upper surface of the base film 150 and removing the conductive material on the upper surface of the protruding pattern 153 and the conductive material on the part of the side of the protruding pattern 153 using an adhesive tape. In this case, when the adhesive tape is adhered on the upper surface of the protruding pattern 153 and a pressure is applied thereto, the conductive material on the upper surface of the protruding pattern 153 and the conductive material of the part of the side of the protruding pattern 153 may be adhered to the adhesive tape while compressing the protruding pattern 153. When the adhesive tape is separated from the protruding pattern 153, the conductive material on the upper surface of the protruding pattern 153 and the conductive material of the part of the side of the protruding pattern 153 may be detached due to the adhesive force of the adhesive tape. Therefore, the first electrode 161 and the second electrode 162 which are spaced apart from each other with the protruding pattern 153 therebetween are formed.

The protruding pattern 153 is bent to form a spiral structure so that the first electrode 161 and the second electrode 162 which are spaced apart from each other along the protruding pattern 162 are bent to form a spiral structure. In this case, the spiral structure of the first electrode 161 and the spiral structure of the second electrode 162 are spaced apart from each other and are staggered from each other. For example, as illustrated in FIG. 1, the first electrode 161 extends from a lower right corner of the supporting substrate 170 to form a spiral structure and the second electrode 162 extends from an upper left corner of the supporting substrate 170 to form a spiral structure. In this case, the first electrode 161 and the second electrode 162 are bent to have a spiral structure, for example, a shape of "C" to be staggered from each other. Therefore, the first electrode 161 and the second electrode 162 are alternately disposed with the protruding pattern 153 therebetween.

The third electrode 140 is disposed on the first electrode 161 and the second electrode 162 and is in contact with the protruding pattern 153. When the pressure is applied, the third electrode 140 electrically connects the first electrode 161 and the second electrode 162 and generates Joule heat based on a current supplied from the first electrode 161 or the second electrode 162. Since the third electrode 140 is a member which generates Joule heat, the third electrode 140 may be referred to as a heat generating layer.

The third electrode 140 includes heat generating particles which generates Joule heat when current flows therethrough. For example, the third electrode 140 may include heat generating particles which are formed of carbon black. The third electrode 140 may include 18.6 wt % of carbon black having an average diameter of 50 nm with respect to a base material of the third electrode 140. Here, PDMS may be used as the base material of the third electrode 140. Since electric conductivity of carbon black is 400 $Sm^{-1}$, when the current flows in the third electrode 140, the carbon black may generate sufficient Joule heat. However, the heat generating particles included in the third electrode 140 is not limited to the carbon black. A material which generates sufficient Joule heat based on current may be used as the heat generating particle. Since the third electrode 140 includes the heat generating particles dispersed in the form of particles, the third electrode 140 may locally generate Joule heat only in an area which is in contact with the first electrode 161 and the second electrode 162.

Since the third electrode 140 needs to electrically connect the first electrode 161 and the second electrode 162, the third electrode 140 has an electric conductivity which is higher than that of the protruding pattern 153. That is, since the protruding pattern 153 serves as an insulator which electrically separates the first electrode 161 and the second electrode 162 from each other, the protruding pattern has a very low electric conductivity. However, the third electrode 140 serves as a conductor which electrically connects the first electrode 161 and the second electrode 162 to each other so that the third electrode 140 has a higher electric conductivity than that of the protruding pattern 153.

In the meantime, since the third electrode 140 needs to generate sufficient Joule heat based on the current, the electric conductivity of the third electrode 140 is lower than that of the first electrode 161 and the second electrode 162. That is, a resistance $R_H$ of the third electrode 140 is higher than that of the first electrode 161 and the second electrode 162 respectively. When the resistance $R_H$ of the third electrode 140 is equal to or lower than that of the first electrode 161 and the second electrode 162 respectively, Joule heat may be generated in the first electrode 161 and the second electrode 162. In this case, color change of the thermochromic layer 120 may not be sufficiently generated.

In order to generate sufficient Joule heat, the electric conductivity of the third electrode 140 is desirably 2.8 to 4.6 $Sm^{-1}$. When the electric conductivity of the third electrode 140 is lower than 2.8 $Sm^{-1}$, the resistance of the third electrode 140 is excessively high so that the third electrode 140 shows an insulator characteristic and may not generate sufficient Joule heat. Further, when the electric conductivity of the third electrode 140 exceeds 4.6 $Sm^{-1}$, the resistance of the third electrode 140 is excessively low so that the Joule heat may be generated also in the first electrode 161 and the second electrode 162 and a range of the generation of Joule heat may be broadened. In this case, it is undesirable because a discoloration range of the thermochromic layer 120 is excessively broad. When the electric conductivity of the third electrode 140 satisfies the above-mentioned range, a sheet resistance of the third electrode 140 may be 5400 to 8900 $\Omega\square^{-1}$.

The third electrode 140 may be formed by coating a base material in which heat generating particles are dispersed on a film having flexibility. For example, the third electrode 140 may be formed by coating PDMS in which carbon black is dispersed on a PET film, but is not limited thereto, and the third electrode 140 may be formed by various methods.

The heat transfer layer 130 is disposed on the third electrode 140 and transfers the Joule heat of the third electrode 140 to the thermochromic layer 120. The heat transfer layer 130 includes heat transfer particles which transfer the Joule heat of the third electrode 140 to the thermochromic layer 120. The heat transfer particles may be configured by various materials having excellent thermal conductivity. For example, the heat transfer particles may be configured by a material having the thermal conductivity of 430 $Wm^{-1}K^{-1}$ or higher. Specifically, the heat transfer particles may be configured by silver (Ag). When the thermal conductivity of the heat transfer particles is lower than 430 $Wm^{-1}K^{-1}$, the heat generated in the third electrode 140 may not be sufficiently transferred to the thermochromic layer 120. However, the kind of the heat transfer particles is not limited thereto and the heat transfer particles may be formed of various materials having a thermal conductivity of 430 $Wm^{-1}K^{-1}$ or higher.

Since the heat transfer layer 130 includes heat transfer particles which are configured as particles, the heat transfer layer 130 may locally transfer the heat of the third electrode 140. Therefore, Joule heat generated at the point where the touch input is applied does not spread to another area where the touch input is not applied and is transferred to the thermochromic layer 120 through the heat transfer layer 130.

The thermal conductivity of the heat transfer layer 130 including heat transfer particles may be 53 $Wm^{-1}K^{-1}$ or higher. In this case, the heat transfer layer 130 may easily transfer the Joule heat of the third electrode 140 to the thermochromic layer 120. If the thermal conductivity of the heat transfer layer 130 is lower than 53 $Wm^{-1}K^{-1}$, the thermal conductivity of the heat transfer layer 130 is too low so that the Joule heat of the third electrode 140 may not be easily transferred to the thermochromic layer 120 and the color change of the thermochromic layer 120 may not be clearly generated. In the meantime, as the thermal conductivity of the heat transfer layer 130 is higher, the Joule heat of the third electrode 140 is easily transferred to the thermochromic layer 120. Therefore, in the contact sensitive device 100 according to the exemplary embodiment of the present disclosure, a specific upper limit value of the thermal conductivity of the heat transfer layer 130 is not limited.

The heat transfer layer 130 may be formed by dispersing heat transfer particles in the base material and then coating the base material on a film having flexibility. In this case, the base material may be PDMS and the film having flexibility may be a PET film. For example, the heat transfer layer 130 may be formed by dispersing silver particles having a particle size of 2 to 3.5 µm into PDMS with a content ratio of 50 wt % with respect to a total weight of PDMS and then coating the PDMS in which the silver particles are dispersed on the PET film. However, the content of the heat transfer particles is not limited thereto and may be appropriately selected in consideration of the thermal conductivity of the heat transfer particles and the thermal conductivity of the base material. That is, when the thermal conductivity of the heat transfer particles is low, the thermal conductivity of the heat transfer layer 130 may be improved by dispersing the heat transfer particles with a content higher than 50 wt %. Further, when the thermal conductivity of the heat transfer particles is high, the thermal conductivity of the heat transfer layer 130 may be improved by dispersing the heat transfer particles with a content lower than 50 wt %. By doing this, the thermal conductivity of the heat transfer layer 130 may be appropriately adjusted.

In the meantime, the heat transfer layer 130 may be configured by an opaque layer which reflects light of a specific wavelength. As mentioned above, the thermochromic layer 120 includes thermochromic particles having translucency in response to heat, so that the thermochromic layer 120 may be transparent at the point where the touch input is applied. In this case, the color of the heat transfer layer 130 disposed below the thermochromic layer 120 may be visible from the outside. For example, when the heat transfer layer 130 includes silver particles which reflect light having all wavelengths in a visible light region, the heat transfer layer 130 is viewed as white. When the touch input is input, if the thermochromic layer 120 becomes transparent, the color of the heat transfer layer 130 below the thermochromic layer 120 is visible from the outside so that the color at the point where the touch input is applied may be viewed as white.

In this case, the color of the visual feedback in accordance with the touch input may be determined by adjusting the color of the heat transfer layer 130. Specifically, when the heat transfer layer 130 includes heat transfer particles which reflects light of a specific wavelength, the heat transfer layer 130 may have a color corresponding to a specific wavelength and the color at the point where the touch input is applied may be determined by a color corresponding to the specific wavelength which is reflected by the heat transfer layer 130. In some exemplary embodiments, the heat transfer layer 130 may further include a dye which reflects light of a specific wavelength. In this case, the color of the heat transfer layer 130 may be determined by a dye included in the heat transfer layer 130 and the color of the visual feedback which is generated in accordance with the touch input may be determined by the color of the dye included in the heat transfer layer 130.

In the meantime, in some exemplary embodiments, the heat transfer layer 130 may be omitted. In this case, the thermochromic layer 120 is in direct contact with the third electrode 140 and the Joule heat of the third electrode 140 may be directly transferred to the thermochromic layer 120. In this case, the third electrode 140 may include a dye which reflects light of a specific wavelength and have a specific color. In this case, the color of the visual feedback which is generated in accordance with the touch input may be determined by the color of the third electrode 140. When the third electrode 140 and the thermochromic layer 120 are in direct contact with each other, the Joule heat of the third electrode 140 is directly transferred to the thermochromic layer 120 without passing through the heat transfer layer 130. Therefore, the color change of the thermochromic layer 120 may be more quickly generated and the speed of generating the visual feedback corresponding to the touch input may be faster. Accordingly, the response speed of the contact sensitive element 100 may be faster.

The thermochromic layer 120 is disposed on the heat transfer layer 130 and the color of the thermochromic layer 120 is changed by heat. The thermochromic layer 120 includes thermochromic particles whose color is changed by the heat. The thermochromic particles may be capsules including a thermochromic dye whose optical property is changed by heat energy. The thermochromic dye may be configured by an electron donor and an electron acceptor. When the heat energy is applied, the electron donor and the electron acceptor are coupled to each other or separated from each other to transmit light of the visible light wavelength. Therefore, when a temperature of the thermochromic layer 120 rises, the thermochromic layer 120 may have translucency.

In the meantime, in some exemplary embodiments, the thermochromic particles of the thermochromic layer 120 may include molecules having optical refractive index anisotropy. When the heat energy is applied to the thermochromic particle, an alignment of the molecules is changed so that light of the visible light wavelength is transmitted and the thermochromic layer 120 may have translucency.

The thermochromic particles of the thermochromic layer 120 may be a capsule having an average diameter of 1 to 5 μm and may include an acrylic resin component and a leuco dye. The leuco dye has an open ring chain structure at a temperature which is lower than 40° C. to have a specific color. The leuco dye has a closed ring chain structure at a temperature which is higher than 40° C. to transmit light of a visible light wavelength and have transparency. However, the kind of the thermochromic dye is not limited thereto and the thermochromic particles may include various types of dyes whose color is changed at a room temperature (20° C.) or higher.

As mentioned above, the thermochromic layer 120 includes capsule type thermochromic particles and the optical characteristic of the thermochromic particles are changed by the heat energy so that the color of the thermochromic layer 120 may be changed at a specific point where heat is applied. That is, the thermochromic layer 120 may be locally transparent at a point where the touch input is applied and the color of the heat transfer layer 130 below the thermochromic layer 120 may be visible from the outside. Therefore, the visual feedback in accordance with the touch input may be provided.

The protective substrate 110 is disposed on the thermochromic layer 120 and protects the thermochromic layer 120, the heat transfer layer 130, and the third electrode 140 from an external environment. The protective substrate 110 may be configured by glass or a plastic film having excellent transmittance so that the colors of the thermochromic layer 120 and the heat transfer layer 130 are satisfactorily visible. For example, the protective layer 110 may be configured by a film formed of a polymer such as polyimide, polyethylene terephthalate, or polycarbonate (PC).

As mentioned above, the protective substrate 110, the thermochromic layer 120, the heat transfer layer 130, and the third electrode 140 are configured by a flexible film to be bent in response to the touch input and compress the protruding pattern 153.

That is, as illustrated in FIG. 2A, when the touch input is not applied, the protective substrate 110, the thermochromic layer 120, the heat transfer layer 130, and the third electrode 140 are not bent and are supported by the protruding pattern 153.

As illustrated in FIG. 2B, when the touch input is applied, the touch input causes the protective substrate 110, the thermochromic layer 120, the heat transfer layer 130, and the third electrode 140 to be bent and compresses the protruding pattern 153. When the protruding pattern 153 is sufficiently compressed, the third electrode 140 is in contact with the first electrode 161 and the second electrode 162 and current flows in the third electrode 140 due to a potential difference between the first electrode 161 and the second electrode 162. As mentioned above, the electric conductivity of the third electrode 140 is lower than that of the first electrode 161 and the second electrode 162 and the resistance $R_H$ of the third electrode 140 is higher than that of the first electrode 161 and the second electrode 162 respectively so that the Joule heat may be generated in the third electrode 140. This will be described in more detail with reference to FIG. 3.

Figure 3:
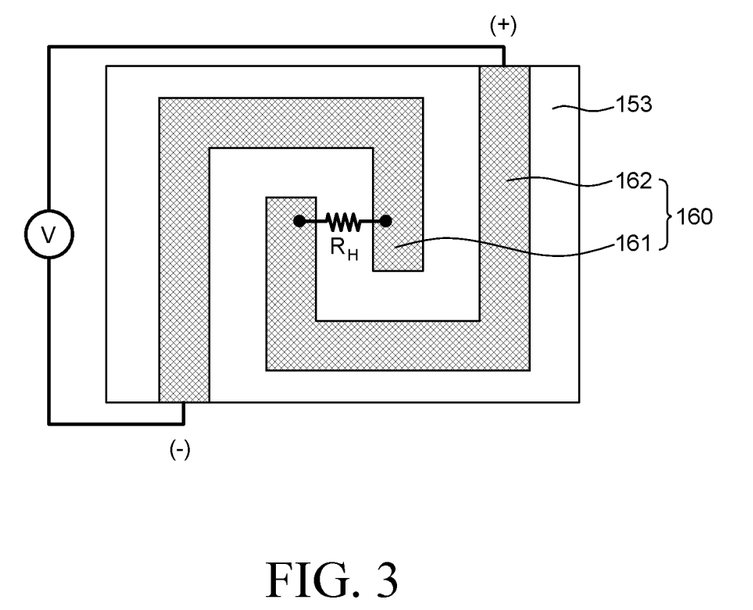
FIG. 3 is a schematic plan view for explaining a driving method of a contact sensitive element according to an exemplary embodiment of the present disclosure.

FIG. 3 is a schematic cross-sectional view for explaining a contact sensitive element according to an exemplary embodiment of the present disclosure. Referring to FIG. 3, the first electrode 161 and the second electrode 162 are bent in a "C" shape to be staggered from each other. Therefore, the first electrode 161 and the second electrode 162 are opposite to each other with the protruding pattern 153 therebetween. When the touch input is applied so that the third electrode 140 is in contact with the first electrode 161 and the second electrode 162, the first electrode 161 and the second electrode 162 are connected to each other by the third electrode 140.

In the meantime, as illustrated in FIG. 3, different voltages may be applied to the first electrode 161 and the second electrode 162. For example, a negative voltage is applied to the first electrode 161 and a positive electrode is applied to the second electrode 162. However, the present disclosure is not limited thereto and a predetermined voltage is applied to any one of the first electrode 161 and the second electrode 162 and the remaining electrode to which no voltage is applied may be grounded.

Since the third electrode 140 has a higher electric conductivity than that of the protruding pattern 153, the current generated due to the potential difference between the first electrode 161 and the second electrode 162 may flow through the third electrode 140. However, the third electrode 140 has a higher resistance $R_H$ than that of the first electrode 161 and the second electrode 162, so that the Joule heat due to the resistance $R_H$ may be generated while the current flows.

The Joule heat of the third electrode 140 is locally generated at a point where the first electrode 161, the second electrode 162, and the third electrode 140 are in contact with each other and the Joule heat of the third electrode 140 is transferred to the thermochromic layer 120 through the heat transfer layer 130. The color of the thermochromic layer 120 is changed by the transferred heat energy and the visual feedback for the touch input is generated.

In the meantime, the contact sensitive device 100 according to an exemplary embodiment of the present disclosure may provide different visual feedbacks depending on the strength of the touch input. Specifically, when the strength of the touch input is increased, the pressure due to the touch input is increased and the protective substrate 110, the thermochromic layer 120, the heat transfer layer 130, and the third electrode 140 may be bent more. In this case, the contact area where the third electrode 140 is in contact with the first electrode 161 and the second electrode 162 may be broadened. Therefore, the Joule heat is generated in a broad range and the discoloration range of the thermochromic layer 120 due to the Joule heat may be broadened. Therefore, the visual feedback for a strong touch input may be generated in a broad range. Consequently, the contact sensitive device 100 according to the exemplary embodiment of the present disclosure provides a narrow range of a visual feedback by changing a narrow range of colors with respect to a weak touch input and provides a broad range of a visual feedback by changing a broad range of colors with respect to a strong touch input.

The third electrode 140 electrically connects the first electrode 161 and the second electrode 162 to each other to generate the Joule heat. Accordingly, the first electrode 161 and the second electrode 162 need to be alternately disposed. Further, the first electrode 161 and the second electrode 162 need to be densely disposed in order to provide a fine visual feedback in response to a fine touch input. An arrangement of the first electrode 161 and the second electrode 162 will be described in more detail with reference to FIGS. 4A and 4B.

Figure 4A:
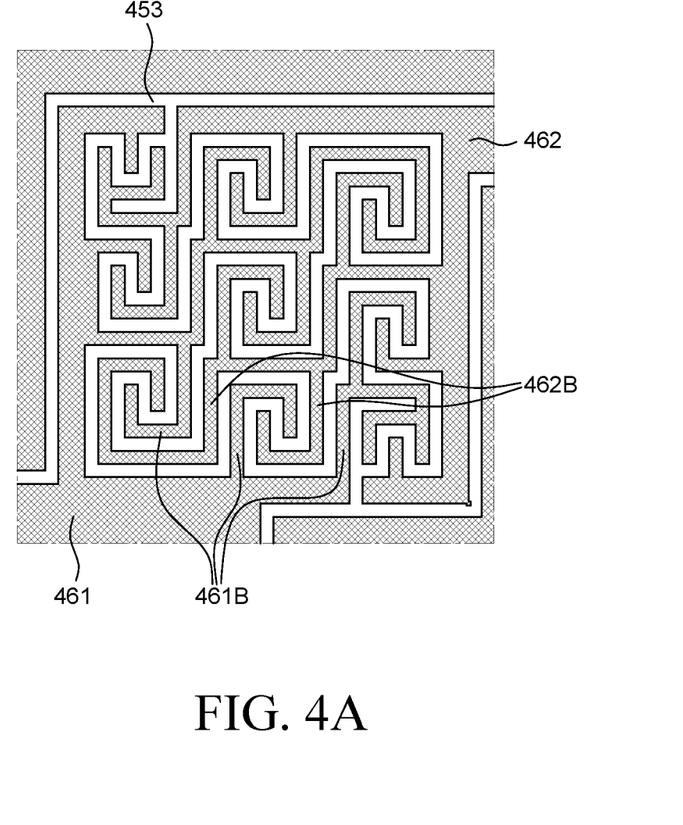
FIGS. 4A and 4B are schematic plan views for explaining an electrode arrangement structure of a contact sensitive device according to an exemplary embodiment of the present disclosure.
Figure 4B:
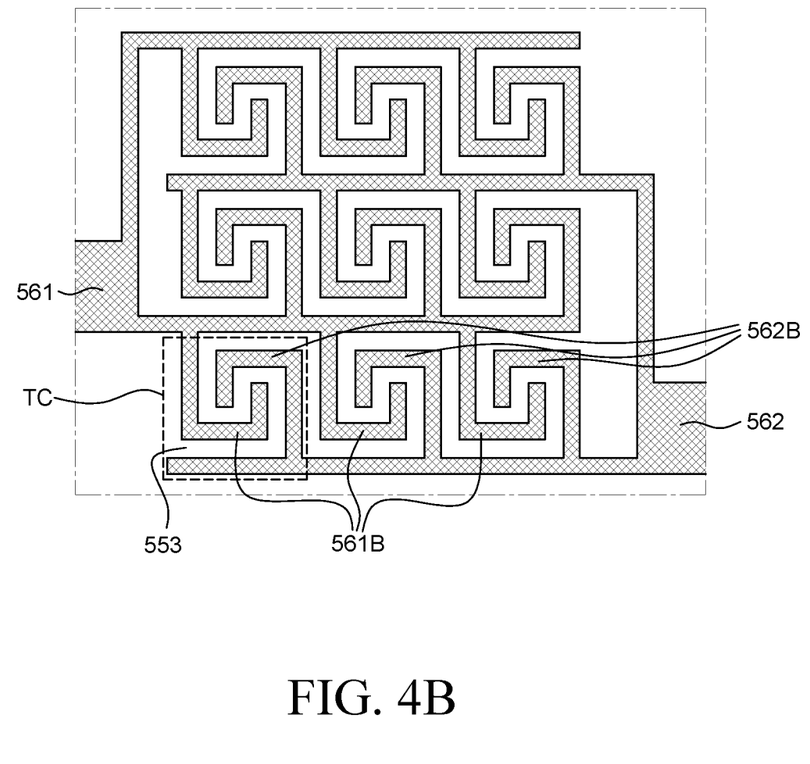

FIGS. 4A and 4B are schematic plan views for explaining an electrode arrangement structure of a contact sensitive device according to an exemplary embodiment of the present disclosure. In FIGS. 4A and 4B, the remaining components except for the first electrodes 461 and 561, the second electrodes 462 and 562, and the protruding patterns 453 and 553 are omitted.

Referring to FIG. 4A, the first electrode 461 and the second electrode 462 may include a plurality of branch electrodes 461B and 462B, respectively. The first branch electrodes 461B are branched from the first electrode 461 and are bent in a "C" shape. The second branch electrodes 462B are branched from the second electrode 462 and are bent in a "C" shape. The first branch electrodes 461B and the second branch electrodes 462B are staggered from each other and are alternately disposed with the protruding pattern 453 therebetween. The first branch electrodes 461B and the second branch electrodes 462B are bent to be staggered from each other to form a complex maze structure.

As mentioned above, the third electrode is disposed on the first electrode 461 and the second electrode 462 to cover the entire base film on which the first electrode 461 and the second electrode 462 are disposed. When a touch input is applied, a part of the first branch electrodes 461B and a part of the second branch electrodes 462B are connected to each other by the third electrode at a point where the touch input is applied. In this case, the current flows in the third electrode at the point where the touch input is applied and a local Joule heat is generated in the third electrode so that the color of the thermochromic layer at the corresponding point is changed.

When the first branch electrodes 461B and the second branch electrodes 462B form a maze structure, the contact sensitive device may sense fine touch input and provides fine visual feedback.

Specifically, the protruding pattern 453 may have a pattern corresponding to the maze structure to form the first branch electrodes 461B and the second branch electrodes 462B of the maze structure. That is, the protruding pattern 453 does not extend in one direction, but is bent to extend in various directions. If the protruding pattern 453 extends only in a vertical direction, the compression of the protruding pattern 453 may be generated along the vertical direction. In this case, the third electrode causes the first electrode 461 and the second electrode 462 to be in contact with each other along the vertical direction and generates the Joule heat along the vertical direction. Therefore, the visual feedback may be generated in stripes along the vertical direction. Even though the protruding pattern 453 is densely disposed, the compression of the protruding pattern 453 is generated along the arrangement of the protruding pattern 453. Therefore, the Joule heat may be lengthily generated in the arrangement direction of the protruding pattern 453. Therefore, even though a circular touch input is applied, a long oval shape visual feedback may be generated in the arrangement direction of the protruding pattern 453.

In contrast, as illustrated in FIG. 4A, when the protruding pattern 453 is bent in various directions, the pressure of the protruding pattern 453 is generated along various directions. In this case, the third electrode causes the first electrode 461 and the second electrode 462 to be in contact with each other along a horizontal direction and a vertical direction and the Joule heat is generated along the horizontal direction and the vertical direction. Therefore, the Joule heat is uniformly generated up and down and left and right and a fine visual feedback corresponding to the touch input may be provided.

As mentioned above, widths of the first branch electrodes 461B and the second branch electrodes 462B and an interval between the first branch electrodes 461B and the second branch electrodes 462B may vary depending on a pressure range of the touch input which is applied to the contact sensitive device and a resolution of a required visual feedback. For example, when the contact sensitive device is applied to a device which requires a visual feedback having a high resolution, the widths of the first branch electrodes 461B and the second branch electrodes 452B and the interval therebetween may be designed to be small. In contrast, when the contact sensitive device is applied to a device in which a visual feedback having a low resolution is required and a large touch input is mainly input, the widths of the first branch electrodes 461B and the second branch electrodes 452B and the interval therebetween may be designed to be large.

Referring to FIG. 4B, the first electrode 561 and the second electrode 562 include a plurality of branch electrodes 561B and 562B, respectively. The first branch electrodes 561B and the second branch electrodes 562B may form a plurality of touch cells TC.

Specifically, the first branch electrodes 561B are branched from the first electrode 561 and are spirally bent. Therefore, as illustrated in FIG. 4B, the first branch electrodes 561B are bent in a "C" shape. The second branch electrodes 562B are branched from the second electrode 562 and are spirally bent. Therefore, the second branch electrodes 562B are bent in a "C" shape. The first branch electrodes 561B and the second branch electrodes 562B are staggered from each other and are disposed to be opposite to each other with the protruding pattern 553 therebetween.

The plurality of touch cells TC refers to a minimum unit area which senses the touch input of a user and transfers a visual feedback in accordance with the touch input. In this case, an area of the touch cell TC may be determined in consideration of a size of fingers of a normal people.

The first branch electrodes 561B and the second branch electrodes 562B are bent to extend in various directions in one touch cell TC. That is, the protruding pattern 553 extends in various directions in one touch cell TC. Therefore, the compression of the protruding pattern 553 due to the touch input may be generated to be dispersed up and down and left and right and the Joule heat by the third electrode may be uniformly generated at the point where the touch input is applied.

The first branch electrode 561B in one touch cell TC is connected to the first branch electrode 561B in another touch cell. For example, as illustrated in FIG. 4B, the first branch electrodes 561 may be branched in a vertical direction from the first electrode 561 extending in the horizontal direction and may be bent in a "C" shape in the touch cell TC.

Since the first electrode 561 and the second electrode 562 illustrated in FIG. 4B form a plurality of touch cells TC having regularity, it is possible to accurately sense the touch input in a region where the touch cell TC is disposed and a visual feedback which exactly corresponds to the touch input.

As mentioned above, the contact sensitive device according to the exemplary embodiment of the present disclosure includes a thermochromic layer in which color is changed at a temperature of a room temperature or higher and the color of the thermochromic layer may vary depending on the Joule heat which is generated from the third electrode which is configured to be in contact with the first electrode and the second electrode while compressing the protruding pattern at the point where the touch input is applied. Therefore, the contact sensitive device according to the exemplary embodiment of the present disclosure may sense the touch input with a simple structure and provide visual feedback in accordance with the touch input. Specifically, the contact sensitive device does not include a separate display panel which provides a visual feedback so that various advantages are provided. Specifically, as the display panel is omitted, the contact sensitive device may have a very thin thickness and does not need to drive the display panel, so that a driving voltage which drives the contact sensitive device is reduced. Further, the display panel is omitted, so that the manufacturing cost of the contact sensitive device may be saved. In the meantime, the contact sensitive device according to the exemplary embodiment of the present disclosure simultaneously senses the touch input and provides the visual feedback using one device. Therefore, the response speed thereof is improved as compared with the contact sensitive device of the related art in which the touch input is sensed and the visual feedback is provided by separate devices, respectively.

Figure 5A:
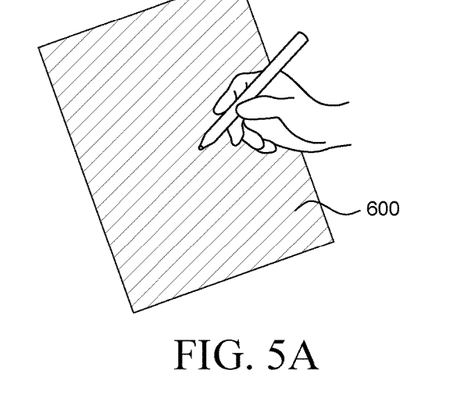
FIGS. 5A to 5C are views illustrating examples in which a contact sensitive device according to various exemplary embodiments of the present disclosure is advantageously utilized.
Figure 5B:
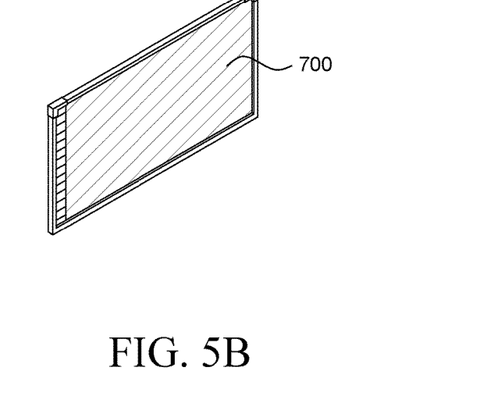
Figure 5C:
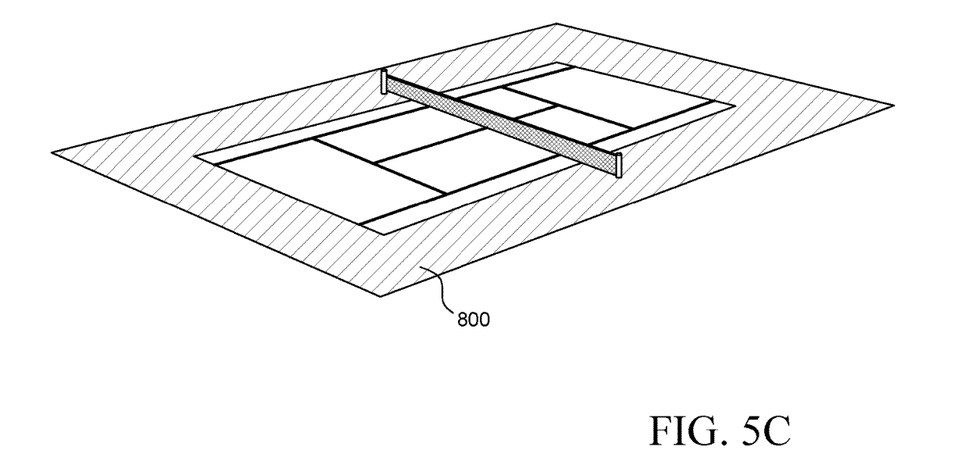

Specifically, the contact sensitive device according to the exemplary embodiment of the present disclosure provides not only a visual feedback corresponding to a coordinate of the touch input but also a visual feedback corresponding to a strength of the touch input. Therefore, the contact sensitive device may provide various visual feedbacks in accordance with the touch input of the user. Hereinbelow, various advantages of a device which utilizes the contact sensitive device according to the exemplary embodiment of the present disclosure will be described with reference to FIG. 5.

FIGS. 5A to 5C are views illustrating examples in which the contact sensitive device according to various exemplary embodiments of the present disclosure is advantageously utilized.

FIG. 5A illustrates an example in which a contact sensitive device 600 according to an exemplary embodiment of the present disclosure is applied to an electronic note. When a contact sensitive device 600 according to an exemplary embodiment of the present disclosure is applied to the electronic note, it is possible to implement the electronic note to have a very small thickness like an actual paper and quickly provide the visual feedback according to a handwriting input, like handwriting on an actual paper.

Specifically, the electronic note of the related art includes a touch panel for sensing a handwriting input of a user and a display panel for providing a visual image in accordance with the handwriting input. When the handwriting input of the user is applied, the touch panel of the electronic note generates coordinate information for the handwriting input of the user and the display panel generates and displays image data based on the coordinate information generated in the touch panel. Therefore, the electronic note of the related art needs to perform an operation of calculating a coordinate of the handwriting input and an operation of generating image data corresponding to the coordinate of the handwriting input to provide the visual feedback for the handwriting input. However, the electronic note of the related art cannot provide immediate visual feedback for the handwriting input. Therefore, the electronic note of the related art has a disadvantage in that handwriting sensitivity is lower than that of an actual paper note. Further, the touch panel of the electronic note of the related art detects the coordinate of the touch input, but cannot detect the strength of the touch input. Therefore, a separate pressure sensor needs to be provided to detect the strength of the handwriting input. The electronic note including a separate pressure sensor needs to additionally perform an operation of calculating a strength of the touch input and an operation of generating a visual feedback in accordance with the strength of the touch input, so that providing of the visual feedback corresponding to the handwriting input is further delayed.

However, an electronic note which uses the contact sensitive device 600 according to the exemplary embodiment of the present disclosure may simultaneously sense the touch input and provide the visual feedback, so that the user may feel as if the user writes something on an actual paper. Specifically, the electronic note which includes the contact sensitive device 600 according to the exemplary embodiment of the present disclosure does not need to include a separate display panel to implement a visual feedback so that the electronic note may be as thin as an actual paper and the manufacturing cost of the electronic note may be reduced. Further, a power for driving the display panel is not necessary so that the power consumption of the electronic note is reduced as compared with the electronic note of the related art. Specifically, the contact sensitive device 600 according to the exemplary embodiment of the present disclosure provides different visual feedbacks depending on the strength of the touch input so that it is possible to provide a visual feedback with a bold line may be provided for a strong handwriting input and a feeling similar to the handwriting on the actual paper to the user.

FIG. 5B illustrates an example in which a contact sensitive device 700 according to an exemplary embodiment of the present disclosure is applied to an interactive whiteboard. The interactive whiteboard may include a contact sensitive device 700, a speaker, and a structure for protecting the contact sensitive device and the speaker from an external impact. When the contact sensitive device 700 according to the exemplary embodiment of the present disclosure is applied to the interactive whiteboard, an educator directly inputs lecture contents to the interactive whiteboard using a stylus pen or a finger to transmit visual data to an educate. In this case, the interactive whiteboard may be configured such that a thickness of the letters is changed according to an input strength of the stylus pen or finger of the educator and the educator may emphasize a specific part by changing the strength of the touch input. By doing this, effect of the education may be maximized.

Specifically, the contact sensitive device 700 according to the exemplary embodiment of the present disclosure may be implemented as a thin film so that the interactive whiteboard may be implemented by attaching the contact sensitive device 700 film to a normal blackboard or a wall. In this case, there is an advantage in that the interactive whiteboard may be implemented in various locations without being restricted to a space.

FIG. 5C illustrates an example in which a contact sensitive device 800 according to an exemplary embodiment of the present disclosure is applied to a sports game. Specifically, the contact sensitive device 800 may be applied to an outer boundary of a court line in sports such as tennis. In this case, the contact sensitive device 800 may be used as a judgement tool for determining whether a tennis ball is out of the court line. That is, when the tennis ball is out of the court line, a color of a specific part of the contact sensitive device 800 which is disposed at the outer boundary of the court line may be changed. In the conventional tennis game, a referee identifies whether the tennis ball is out of the court line with the naked eye. However, when the contact sensitive device 800 according to the exemplary embodiment of the present disclosure is applied to the tennis court, whether the tennis ball is out of the court line may be identified through the contact sensitive device 800. Therefore, there is an advantage in that more accurate judgement is allowed and reliability of the game judgement is improved.

The exemplary embodiments of the present disclosure can also be described as follows:

In order to solve the above-described problems, a contact sensitive device according to an aspect of the present disclosure includes a base film, a first electrode, a second electrode, a third electrode, and a thermochromic layer. A protruding pattern is disposed on the base film. The first electrode and the second electrode are disposed on the base film and are spaced apart from each other with the protruding pattern therebetween. The third electrode is in contact with the protruding pattern. The thermochromic layer is disposed on the third electrode. The contact sensitive device according to the exemplary embodiment of the present disclosure includes the third electrode which is in contact with the first electrode and the second electrode to generate Joule heat and the thermochromic layer which changes the color based on the Joule heat of the third electrode so that when a touch input is applied, it is possible to simultaneously sense the touch input and provide a visual feedback corresponding to the touch input. Further, it is possible to sense the touch input and provide the visual feedback corresponding to the touch input without using a separate display panel so that a contact sensitive device which has a small thickness, low power consumption, and a low manufacturing cost may be provided.

According to another aspect of the present disclosure, the thermochromic layer may include thermochromic particles whose color is changed by heat.

According to another aspect of the present disclosure, a color of the thermochromic particles may be changed at a temperature which is higher than 20° C.

According to another aspect of the present disclosure, the contact sensitive device may further include a heat transfer layer which is disposed between the third electrode and the thermochromic layer and includes a heat transfer particle.

According to another aspect of the present disclosure, a thermal conductivity of the heat transfer layer may be higher than 53 W m$^{-1}$ K$^{-1}$.

According to another aspect of the present disclosure, a thermal conductivity of the heat transfer particles may be higher than 430 W m$^{-1}$ K$^{-1}$.

According to another aspect of the present disclosure, the heat transfer layer may reflect light of a specific wavelength.

According to another aspect of the present disclosure, the third electrode may include heat generating particles which generate Joule heat when a current flows.

According to another aspect of the present disclosure, an electric conductivity of the third electrode may be higher than an electric conductivity of the protruding pattern and a resistance of the third electrode may be higher than a resistance of the first electrode and a resistance of the second electrode respectively.

According to another aspect of the present disclosure, the electric conductivity of the third electrode may be 2.8 to 4.6 S m$^{-1}$.

According to another aspect of the present disclosure, the heat generating particles may be formed of carbon black.

According to another aspect of the present disclosure, the first electrode and the second electrode may be spirally bent to be opposite to each other.

According to another aspect of the present disclosure, Young's modulus of the protruding pattern may be higher than 1.5 MPa.

According to another aspect of the present disclosure, a part of the third electrode corresponding to a region where an external pressure is not applied may be spaced apart from the first electrode and the second electrode and a part of the third electrode corresponding to a region where an external pressure is applied may be in contact with the first electrode and the second electrode.

In order to solve the problem as described above, a contact sensitive device according to another aspect of the present disclosure includes a base film, a plurality of electrodes, a heat generating layer, a heat transfer layer, a thermochromic layer, and a protective substrate. The base film includes a base part and a protrusion part protruding from the base. The plurality of electrodes is disposed on the base film to cover at least a part of the side of the protrusion part and the base part. The heat generating layer is in contact with the protrusion part on the plurality of electrodes. The heat transfer layer is disposed on the heat generating layer. The thermochromic layer is disposed on the heat transfer layer. The protective substrate is disposed on the thermochromic layer.

According to another aspect of the present disclosure, the plurality of electrodes may include a plurality of branch electrodes, the plurality of branch electrodes may form a plurality of touch cells, and the plurality of branch electrodes may be bent in a "C" shape to be staggered from each other in the plurality of touch cells.

According to another aspect of the present disclosure, the plurality of branch electrodes in the plurality of touch cells may include a plurality of first branch electrodes and a plurality of second branch electrodes which are spaced apart from each other with the protrusion therebetween, a first branch electrode of one touch cell among the plurality of touch cells may be connected to a first branch electrode of an adjacent touch cell which is adjacent to the one touch cell, and a second branch electrode of the one touch cell may be connected to a second branch electrode of the adjacent touch cell.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical spirit of the present disclosure. The scope of the technical spirit of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A contact sensitive device, comprising:
  a base film on which a protruding pattern is disposed;
  a first electrode and a second electrode which are disposed on the base film and are spaced apart from each other with the protruding pattern therebetween;
  a third electrode which is in contact with the protruding pattern; and
  a thermochromic layer on the third electrode.

2. The contact sensitive device according to claim 1, wherein the thermochromic layer includes thermochromic particles whose color is changed by heat.

3. The contact sensitive device according to claim 2, wherein a color of the thermochromic particles is changed at a temperature which is higher than 20° C.

4. The contact sensitive device according to claim 1, further comprising:
  a heat transfer layer which is disposed between the third electrode and the thermochromic layer and includes heat transfer particles.

5. The contact sensitive device according to claim 4, wherein a thermal conductivity of the heat transfer layer is higher than 53 W m$^{-1}$ K$^{-1}$.

6. The contact sensitive device according to claim 5, wherein a thermal conductivity of the heat transfer particles is higher than 430 W m$^{-1}$ K$^{-1}$.

7. The contact sensitive device according to claim 4, wherein the heat transfer layer reflects light of a specific wavelength.

8. The contact sensitive device according to claim 1, wherein the third electrode includes heat generating particles which generate Joule heat when a current flows.

9. The contact sensitive device according to claim 8, wherein an electric conductivity of the third electrode is higher than an electric conductivity of the protruding pattern and a resistance of the third electrode is higher than a resistance of the first electrode and a resistance of the second electrode respectively.

10. The contact sensitive device according to claim 9, wherein the electric conductivity of the third electrode is 2.8 to 4.6 S m$^{-1}$.

11. The contact sensitive device according to claim 8, wherein the heat generating particles are formed of carbon black.

12. The contact sensitive device according to claim 1, wherein the first electrode and the second electrode are spirally bent to be opposite to each other.

13. The contact sensitive device according to claim 1, wherein Young's modulus of the protruding pattern is higher than 1.5 MPa.

14. The contact sensitive device according to claim 1, wherein a part of the third electrode corresponding to a region where an external pressure is not applied is spaced apart from the first electrode and the second electrode and another part of the third electrode corresponding to a region where an external pressure is applied is in contact with the first electrode and the second electrode.

15. A contact sensitive device, comprising:
  a base film which includes a base part and a protrusion part protruding from the base part;
  a plurality of electrodes disposed on the base film to cover at least a part of a side of the protrusion part and the base part;
  a heat generating layer which is in contact with the protrusion part on the plurality of electrodes;
  a heat transfer layer on the heat generating layer;
  a thermochromic layer on the heat transfer layer; and
  a protective substrate on the thermochromic layer.

16. The contact sensitive device according to claim 15, wherein the plurality of electrodes includes a plurality of branch electrodes, the plurality of branch electrodes forms a plurality of touch cells, and the plurality of branch electrodes is bent in a "C" shape to be staggered from each other in the plurality of touch cells.

17. The contact sensitive device according to claim 16, wherein the plurality of branch electrodes in the plurality of touch cells includes a plurality of first branch electrodes and a plurality of second branch electrodes which are spaced apart from each other with the protrusion therebetween,
  wherein a first branch electrode of one touch cell among the plurality of touch cells is connected to a first branch electrode of an adjacent touch cell which is adjacent to the one touch cell, and a second branch electrode of the one touch cell is connected to a second branch electrode of the adjacent touch cell.

* * * * *